C. T. BANGS.
PACKING FOR SLEEVE VALVES OF ENGINES.
APPLICATION FILED MAR. 18, 1914.
1,222,351.
Patented Apr. 10, 1917.
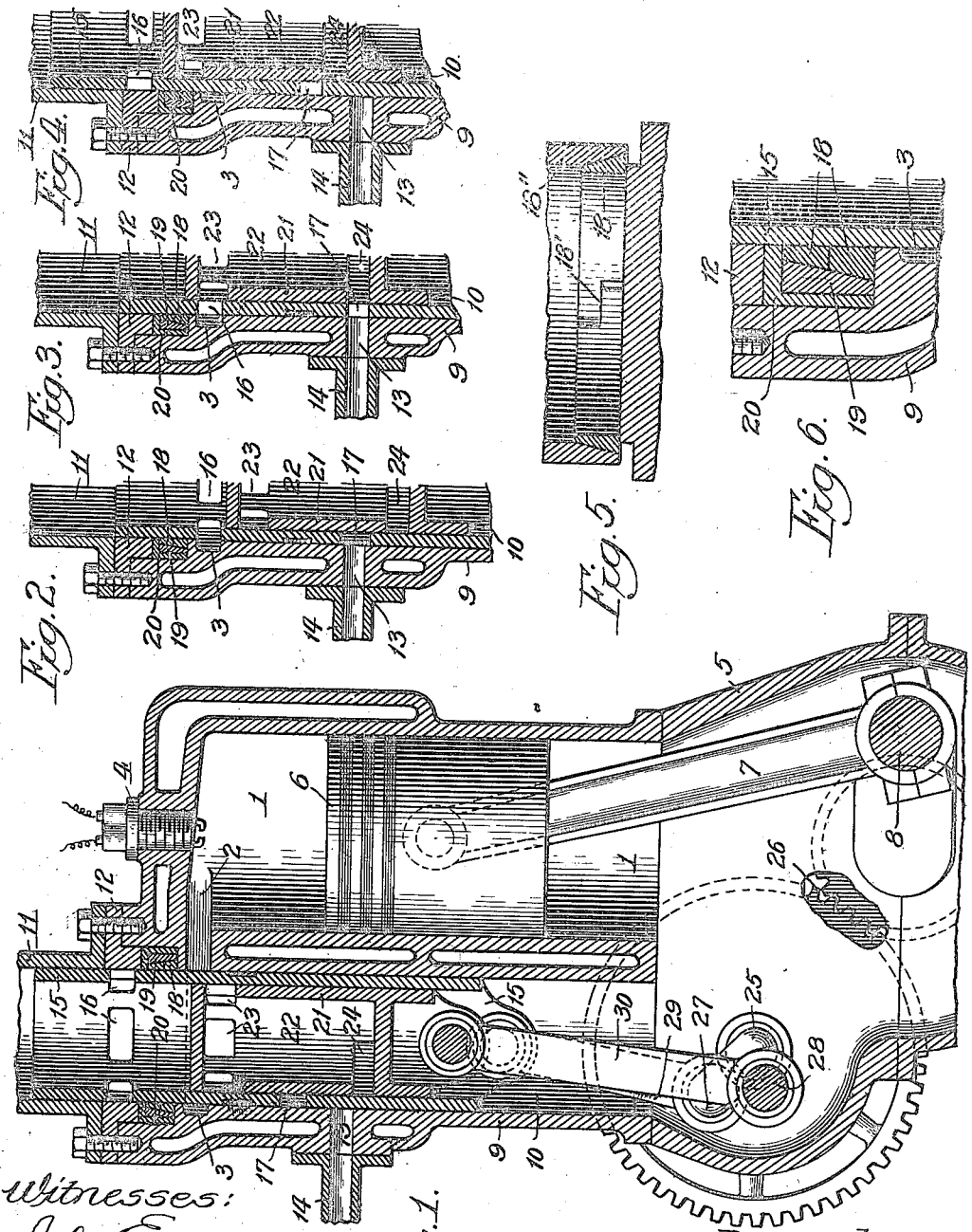

UNITED STATES PATENT OFFICE.

CHESTER T. BANGS, OF OTTAWA, ILLINOIS.

PACKING FOR SLEEVE-VALVES OF ENGINES.

1,222,351.  Specification of Letters Patent.  Patented Apr. 10, 1917.

Application filed March 18, 1914. Serial No. 825,455.

*To all whom it may concern:*

Be it known that I, CHESTER T. BANGS, a citizen of the United States of America, and a resident of Ottawa, in the county of La Salle, State of Illinois, have invented certain new and useful Improvements in Packings for Sleeve-Valves of Engines, of which the following is a specification.

This invention relates to means for packing that type of valve mechanisms for gas engines in which a pair of sleeve valves are operated in unison to control the inlet and outlet ports of the engine in the four-cycle operation of the same. And the present improvement has for its object to provide a simple and efficient formation and arrangement of the packing rings for the outer sleeve member of the valve, whereby leakage past the same is effectively prevented and with which the packing is protected from a direct action of the explosion during such cycle of the operation of the engine.

In the accompanying drawings:

Figure 1, is a vertical sectional elevation of an engine embodying the present invention, the piston and the valve mechanism being shown at a point midway the travel of the piston in the active downward stroke of the same under the stress of the burning gases in the combustion chamber of the engine.

Fig. 2, is a detail sectional elevation, showing the piston and valve mechanism, at a point midway the travel of the piston in the next succeeding upward and exhaust stroke of the same.

Fig. 3, is a similar view, showing the piston and valve mechanism at a point midway the travel of the piston in the next succeeding downward and fuel intake stroke thereof.

Fig. 4, is a similar view, showing the piston and valve mechanism at a point midway the travel of the piston in the next succeeding upward and fuel compression stroke of the same.

Fig. 5, is a detail sectional elevation illustrating means for reducing the diameter of the packing rings during the manufacture of the same.

Fig. 6, is an enlarged detail section of the packing rings and accessories.

Similar reference numerals indicate like parts in the several views.

Referring to the drawings, 1 represents the engine cylinder preferably of the upright water jacketed type, and having an upper end and an open lower end as shown.

2 is the usual inlet-outlet passage disposed near the upper or closed end of the engine cylinder 1, and extending laterally from the explosion chamber thereof, and ending in an annular chamber 3 formed as an expansion of the hereinafter described valve chamber.

4 is an orifice formed centrally in the closure head of the upper end of the cylinder 1, for the reception of an ordinary spark plug or other usual means employed to ignite the fuel charge in a continued operation of the engine.

5 is a casing or housing upon which the cylinder 1 is supported with its open lower end in free communication with the interior of said casing.

6 is the engine piston connected by pitman 7 to the crank shaft 8, suitably journaled in the casing or housing 4, aforesaid.

The parts so far described constitute usual portions of a single acting four cycle internal combustion engine, and may be of any usual detail formation and arrangement.

In the present improvement, 9 is a valve casing preferably disposed at one side of the cylinder 1, and preferably of the water jacketed type shown and cast integrally with the engine cylinder as shown. Said valve casing is formed with a cylindrical bore 10 open at both ends and constituting the valve chamber for the main and supplementary valve members hereinafter described. At bottom said valve chamber 10 opens into the interior of the casing 4 aforesaid, and at top is connected to the lower end of an ordinary exhaust pipe or trunk 11 and in the preferred construction shown in the drawings, the attaching flange of the annular follower gland 12 of the packing means hereinafter described, is disposed between the upper end of the bore or chamber 10 and the lower end of the exhaust pipe or trunk 11.

13 is the fuel intake port or passage opening laterally into the bore or chamber 10 in a plane a distance below the inlet-outlet passage 2 of the engine cylinder above described, and having a pipe connection 14 extending to a carbureter or other usual fuel source.

15 is the main slide valve of an open ended cylindrical shell form, the periphery of which is of a plane formation and adapted to fit and slide in the aforesaid bore or chamber 10 of the valve casing 9, while its cylindrical inner wall is adapted to afford a seat for the supplementary slide valve hereinafter described.

16 are lateral ports formed in the wall of the valve 15 and adapted, at the proper period in the cycle of movements of the engine, to register with the annular chamber 3 and inlet-outlet passage 2 of the engine cylinder to provide an extensive and free outlet for the burnt gases, and at another of said periods permit the inflow of fuel into the combustion chamber of the engine.

17 is a lateral fuel inlet passage formed in the wall of the valve 15 a distance below the exhaust ports 16 just described, and adapted at the proper period in the cycle of movements of the engine, to register with the before described fuel intake passage 13 of the valve casing 9.

18 are a plurality of packing rings, preferably two in number as shown, and which are disposed in an annular recess at the upper portion of the valve chamber 10, aforesaid. In the present invention the valve rings 18 are formed of cast iron and with a tendency to resiliently embrace the periphery of the cylindrical sleeve valve 15, to form a tight joint around the same.

In the manufacture of said packing ring, each ring 18, will be turned in a suitable lathe or like machine, to a diameter slightly larger than that of the cylindrical valve for which it is intended. Its circular wall is then cut or sewn to form the usual split 18' in the ring, after which the same is heated to a point above redness, and while in such heated condition is externally compressed by a taper die or sleeve 18'' or other ordinary means, in order that a permanent set will be effected in the metal of the packing ring. By practical experiment and use it has been found that a piston ring so formed will retain the reduced diameter thus imparted to it, and at the same time possess a resiliency the tendency of which is to return the ring to its normal reduced diameter above described.

The periphery of the pair of packing rings 18, will be preferably made tapering as shown, for convenience in the method of manufacture above described, and for useful coaction with the follower ring now to be described.

19 is a follower ring formed preferably with a tapering bore corresponding with the tapering peripheries of the packing rings 18, and adapted to bear against the same. Said follower ring will be split and formed contractile in manner similar to that described in connection with the packing rings 18, and as so constructed is adapted to aid by its contractile force, the contractile tendency of the packing ring 18, in actual use.

20 is an annular housing fitting the aforesaid annular recess in the valve chamber 10, and forming a containing casing for the packing and follower rings 18, 19, aforesaid, and to such end said housing will have its wall formed of an inverted L shape, in cross-section, with its top surface forming an abutment for the follower gland 12, heretofore described.

21 is the supplementary valve above referred to, and which is arranged to slide with the main valve 15 in coaxial relation thereto. Said supplementary valve comprises a hollow cylindrical body portion closed at its upper and lower ends by upper and lower heads to provide a chamber 22, within the valve.

23, are upper lateral ports formed in the wall of the supplementary valve 21, and adapted at the proper period in the cycle of movements of the engine, to register with the ports 16 of the main valve 15 and with the inlet-outlet passage 2 of the engine cylinder to permit an inflow of fuel into the explosion chamber of the engine.

24, is a lateral fuel inlet passage forward in the wall of the supplementary valve 21, a distance below the above described lateral ports 23, and adapted at the proper period in the cycle of movements of the engine to register with the lateral fuel passage 17 of the main valve 15 and with the fuel intake passage 13 of the valve casing 9, to permit an inflow of fuel therefrom.

The two valves above described operate in unison, and receive differently timed reciprocating movements from a mechanism operatively connected to the engine crank shaft 8, and preferably by the particular mechanism shown in the drawings, and comprising a detail construction as follows:—

25 is a countershaft journaled in parallel relation to the engine shaft 8, and receiving motion therefrom by means of a pair of spur gears 26, proportioned to produce one revolution of the countershaft to two revolutions of the engine shaft 8.

27 and 28 are crank arms formed in the countershaft 24, and disposed one in advance of the other, as shown, placed so that proper timing of the valves is obtained, and individually connected to the main and supplementary valves 15 and 20, by connecting links 29 and 30.

The operation of the present valve mechanism is as follows:—

With the parts in the position illustrated in Fig. 1, the ignition of the fuel charge in the combustion chamber of the engine has taken place, and the engine piston 6 moved half-way down the piston chamber. As the engine piston continues its downward movement the main and supplementary valves 15 and 20 move from the position shown in Fig. 1, toward the position shown in Fig. 2, and as the piston reaches a point near the end of the down-stroke just referred to, the ports 16 of the main valve 15 come into communication with the annular chamber 3 and inlet-outlet passage 2, of the engine cylinder and at the same time the supplementary valve 21 is moved downward so that its upper end uncovers the aforesaid ports 16. The described movement of the valves opens the engine cylinder to the exhaust pipe or trunk 11, and such open condition of the valves prevails during the next upstroke of the piston to attain a free expulsion of the burnt fuel charge in the engine cylinder.

As the engine piston nears the end of the upstroke just referred to, the supplementary valve 21 moves upward from the position shown in Fig. 2, toward the position shown in Fig. 3, and registers its ports 22 with the ports 16 and with the inlet-outlet passage 2 and annular chamber 3, aforesaid, and simultaneously therewith the port 24 of said supplementary valve registers with the port 17 of the main valve and with the fuel intake port 13 of the valve casing, to permit the gaseous fuel to flow into the engine cylinder. This described opening of the valves continues during the next down or fuel intake stroke of the engine piston.

As the engine piston nears the end of the down or fuel intake stroke just referred to, the main and supplementary valves 15 and 21 move from the position shown in Fig. 3, toward the position shown in Fig. 4, so that as the engine piston reaches the end of said down or fuel intake stroke communication between the engine cylinder and the exhaust pipe or trunk 11 is closed. This closing action continues during the next up or compression stroke of the engine piston to attain the required compression of the fuel charge in the combustion chamber of the engine.

At the required point in such fuel compression stroke, the firing of the charge is effected, to complete the first cycle of the operations of the engine, and a continued repetition of the same during the continued use of the engine.

Having thus fully described my said invention what I claim as new and desire to secure by Letters Patent, is:—

1. In a packing for sleeve valves, the combination of a pair of inner contractile packing rings, the peripheries of which have a common taper, an outer contractile follower ring of a length approximating the combined length of said inner rings and formed with a tapering bore corresponding with the aforesaid taper of the inner rings and means for holding the outer and inner rings from independent longitudinal movement, substantially as set forth.

2. In a packing for sleeve valves, the combination of a pair of inner contractile packing rings, the peripheries of which have a common taper, an outer contractile follower ring of a length approximating the combined length of said inner rings and formed with a tapering bore corresponding with the aforesaid taper of the inner rings, and an annular housing inclosing said outer and inner rings and having an inturned annular flange at one end, substantially as set forth.

Signed at Ottawa, Illinois, this 23rd day of February, 1914.

CHESTER T. BANGS.

Witnesses:
FRANK WING,
MARGARET E. LOUTH.